3,143,703
Patented Aug. 4, 1964

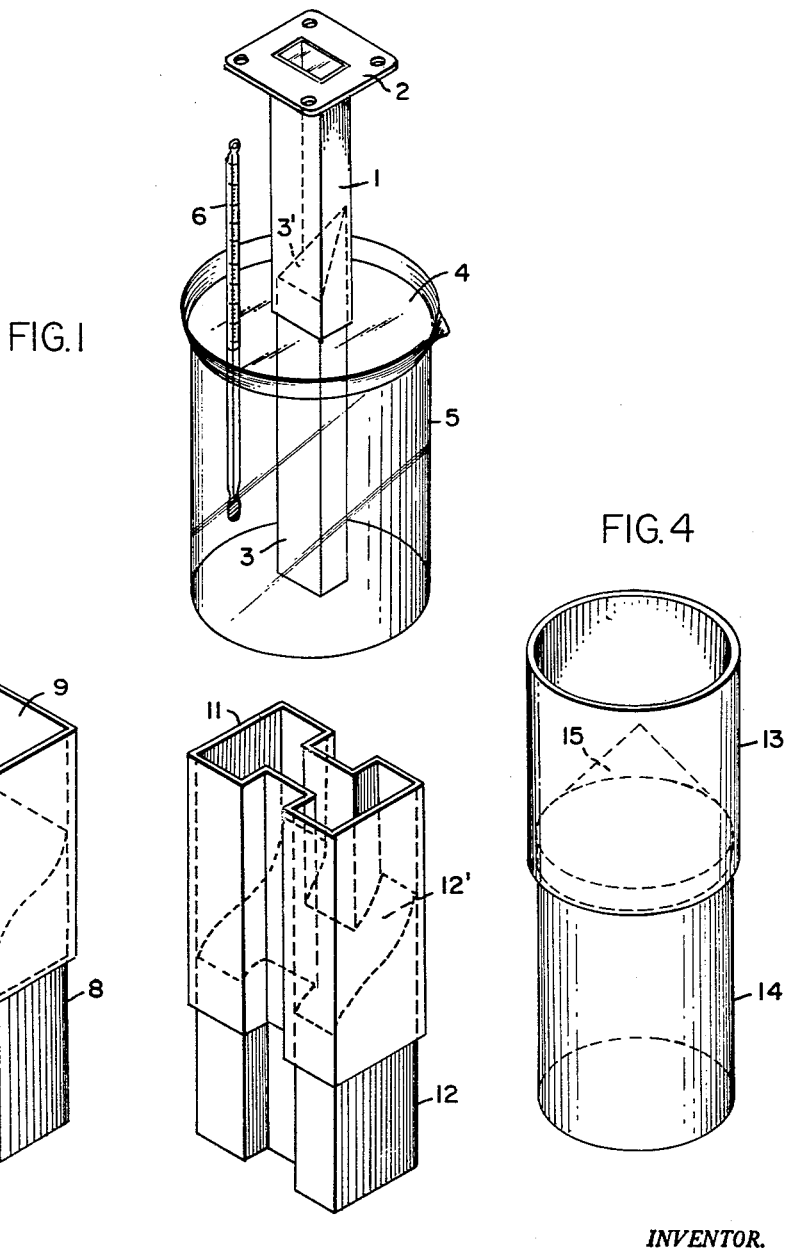

3,143,703
MICROWAVE CALORIMETER WATTMETER WITH A REFLECTIONLESS R.F. TERMINATION
Lincoln D. Kraeuter, Marblehead, Mass., assignor, by mesne assignments, to Varian Associates, Palo Alto, Calif., a corporation of California
Filed Mar. 27, 1961, Ser. No. 98,578
3 Claims. (Cl. 324—95)

This invention relates in general to electrical power measuring apparatus and more particularly pertains to a calorimetric wattmeter for measuring the power of electromagnetic wave energy in the microwave region of the frequency spectrum.

Power in an electrical circuit is the rate at which energy is used and the unit of measurement is the watt. Wattmeters are known which operate to cause the electromagnetic wave energy, whose power is to be measured, to be dissipated as heat and the amount of heat is measured by calorimetric techniques. The field of calorimetry is well developed and accuracies of a high order in measuring heat are attained by advanced methods. Because calorimetric techniques are employed, it is commonly assumed that the measurement of absolute A.C. power is a field in which highly accurate measurements are readily made. For lower frequencies, that is true, but frequencies in the region of a kilomegacycle (i.e., $1 \times 10^9$ c.p.s.) or higher, the measurement of A.C. power is attended by such considerable difficulties that large inaccuracies are perforce tolerated.

The problem of measuring electrical power in the microwave region can be better appreciated when it is realized that at a kilomegacycle, a quarter wavelength wire is eight centimeters long. This fundamental length will cause a wire, whose resistance causes the electrical energy to be transformed into heat, to radiate much of the wave energy applied to it. Thus the conventional wattmeter, which employs a resistive wire, if used at that frequency, would have to be designed with much less than eight centimeters of wire to prevent loss of electrical energy by radiation. Moreover, most microwave systems transmit electromagnetic wave energy through waveguide to eliminate radiation loss. Where waveguide is used to confine the electromagnetic wave energy, any abrupt change in impedance causes reflections of the wave energy. The waveguide is, in some ways, analogous to a voice tube. Any obstacle in the voice tube causes an echo; an obstacle in a waveguide, such a wave energy absorbing device presenting an abrupt change in impedance, causes a reflection of the wave energy. Where a portion of the wave energy in the guide is not turned to heat by the absorbing device, because that energy is reflected, a measurement of electrical power based upon the quantity of heat will be low because it does not account for the power in the reflected waves.

The invention is directed to a termination for a waveguide, the termination causing substantially all the incident microwave energy to be converted into heat. In accordance with the invention, the metallic wall of the waveguide is provided with an extension which is a wall of water having the same interior dimensions as the metallic guide so that no power reflection occurs at the junction. As water is a very lossy conductor, rapid dissipation of the microwave energy takes place. The conversion of microwave energy into heat energy occurs along this wet wall. The heat resulting from the conversion is then primarily observable as a rise in the temperature of the water. It is a simple process to measure the heat energy by calorimeter techniques. In the calorimeter, heat energy is proportional to temperature difference.

The primary object of the invention is to provide a reflectionless termination for a waveguide which is capable of absorbing substantially all the electromagnetic energy in a lossy liquid so as to effect a low reflection coefficient in the waveguide throughout a wide frequency range.

The invention, both as to its construction and mode of operation, can be better understood by a perusal of the following specification when considered in conjunction with the accompanying drawings in which:

FIG. 1 depicts the invention utilized to form a calorimetric wattmeter,

FIG. 2 illustrates the invention applied to rectangular waveguide,

FIG. 3 illustrates the invention applied to ridged rectangular waveguide, and

FIG. 4 illustrates the invention applied to circular waveguide.

Referring now to FIG. 1, there is shown a hollow rectangular metallic waveguide 1 having a source (not shown) of high frequency wave energy coupled to the flanged end 2. The opposite end of the waveguide is plugged by a solid dielectric member 3 having the same exterior dimensions as the interior dimensions of the waveguide. The dielectric plug has an elongated portion protruding beyond the lower end of the waveguide, the protruding portion being immersed in water 4 contained within a dewar flask 5. The member 3 is fabricated of a material having electrical properties similar to the air in the hollow waveguide. Teflon (trade name for polytetrafluorethylene) has proven to be an excellent material because its electrical properties very closely match the electrical properties of air. Teflon has a dielectric constant of two compared to a dielectric constant of one for air. The face of the dielectric insert 3 within the waveguide is tapered as at 3' to present a gradual change in impedance. Energy coupled into the waveguide 1 travels there along and encounters the first impedance discountinuity when it propagates into the face of the plug 3. Because of the nearly identical electrical properties of the air and the plug and the tapered face, the difference in impedance changes so subtly that nearly all the microwave power passes through into the member 3. Only a very minute portion of the wave energy is reflected at the tapered face back toward the microwave energy source. A short distance beyond the tapered portion, the metallic wall of the waveguide is replaced by a wall of water. Because the water wall has the same interior dimensions as the metallic waveguide, no power reflections occur at the junction of the water wall and the metallic wall. As water is a very lossy conductor compared to the metallic wall of the waveguide (which may be silver plated to reduce transmission losses) the microwave energy is rapidly dissipated in the water and is converted to heat energy along the wet wall.

As substantially all the microwave energy coupled into the waveguide is changed into heat energy in the water, it is a simple process to measure the quantity of heat energy by calorimetric techniques. In the calorimeter, heat energy is proportional to temperature difference. Power is the time-rate of change of energy and is represented, in the calorimeter, as the time-rate of change of temperature. Therefore, by employing a thermometer 6 to measure temperature changes, the calorimeter becomes a watt-hour meter. If average microwave power is to be measured, the total heat energy must be divided by the length of time over which the measurement was made. Lower power levels can be measured by operating the calorimeter over a long period of time. Extremely high power level measurements are also possible, first, because the dielectric plug in the end of the waveguide permits the waveguide to be pressurized, and second, because the high power will not cause arcing the Teflon dielectric, a material having excellent voltage breakdown properties. High average power can be handled by employing the continuous flow calorimeter.

While the calorimeter in FIG. 1 has been illustrated, for purposes of simplicity, as a dewar flask, it is to be understood that the actual calorimeter employed will be a more complicated device which is totally enclosed to reduce heat losses. The least detectable microwave power is limited by the erratic leakage of heat into and out of the calorimeter. The erratic heat losses will depend on the manner in which the calorimeter is built, and may be reduced by immersing the calorimeter in oil and by preventing heat leaks where the waveguide enters the calorimeter.

Using a rectangular waveguide of copper having a Teflon dielectric insert, measurements made between the frequencies of 8.2 and 12.4 kilomegacycles have shown that the water wall termination will reflect less than .06% of the power coupled into the waveguide. Since at least 99.94% of the microwave energy is transformed into heat energy, the conversion efficiency is much higher than has been previously obtained at those frequencies with conventional power meters.

FIG. 2 depicts an alternative manner of tapering the face of the dielectric insert in a rectangular waveguide so as to reduce the reflections caused by the change in impedance at that face. The dielectric insert 8 has one end fitted within the metallic rectangular waveguide 9. The interior face 10 of the dielectric plug has a compound curved shape which presents a gradual and smooth change of impedance to wave energy propagating into the guide toward the plugged end. It is understood that the protruding portion of the member 8 is immersed in a lossy liquid, preferably water, so that a liquid wall is formed about the protruding dielectric. The rectangular water-wall waveguide termination can be especially useful in the millimeter and infra-red regions because the Teflon insert may be made as small as .005 by .010 inch. A rectangular waveguide having such internal dimensions and operating in the dominant mode would have a frequency range, approximately, between 800 and 1200 kilomegacycles.

The ridge waveguide 11, illustrated in FIG. 3, is of particular interest because of its broad frequency band transmission characteristic. A dielectric member 12, preferably of Teflon, is machined so that its cross-sectional shape matches the internal cross-section of the waveguide. One end, the end inserted in the waveguide, has its face tapered as at 12′, somewhat in the manner of the tapered face depicted in FIG. 2.

Circular waveguide structures, such as the circular waveguide shown in FIG. 4 are also feasible for infrared wavelengths. The dielectric member 14 has a conical face 15 fitted into the circular waveguide 13 so as to present a gradual change of impedance to the wave energy propagating in the guide.

The water wall termination may be further extended to coaxial line. Many widely different embodiments of this invention could be made without departing from the scope of the invention. It is intended, therefore, that all matter contained in the foregoing description and shown in the accompanying drawings shall be interpreted as illustrative and not in the limiting sense.

What is claimed is:

1. A wattmeter including, a length of hollow waveguide having an opening at a first end for receiving R.F. wave energy from a source of power to be measured and having an opening at a second end of said length of hollow waveguide, a dielectric member having a shape corresponding in cross-section to the internal cross-section of said hollow waveguide, said dielectric member being inserted within said hollow waveguide so as to close off and plug the second end thereof remote from said first end of said guide, an elongated portion of said dielectric plug member protruding outwardly from said waveguide from the plugged end thereof, the inside end of said dielectric plug member disposed within said waveguide having a tapered face to provide a gradual change in impedance to minimize wave reflections therefrom, a calorimeter having water therein, said outwardly protroducing elongated portion of said dielectric plug member being immersed in said water to form an inside wet wall of water surrounding said dielectric member whereby R.F. wave energy is transferred without undue reflection into said water along said wet outer wall of said elongated dielectric plug member, and means for measuring changes in the water temperature.

2. A reflectionless R.F. termination including, a length of hollow waveguide having an opening at a first end for receiving R.F. wave energy from a source of power to be measured and having an opening at a second end of said length of hollow waveguide, a dielectric member having a shape corresponding in cross-section to the internal cross-section of said hollow waveguide, said dielectric member being inserted within said hollow waveguide so as to close off and plug the second end thereof remote from said first end of said guide, an elongated portion of said dielectric plug member protruding outwardly from said waveguide from the plugged end thereof, the inside end of said dielectric plug member disposed within said waveguide having a tapered face to provide a gradual change in impedance to minimize wave reflections therefrom, said outwardly protruding elongated portion of said dielectric plug member being immersed in water to form an inside wet wall of water surrounding said dielectric member whereby R.F. wave energy is transferred without undue reflection into said water along the wet outer wall of said elongated dielectric plug member.

3. The apparatus according to claim 2 wherein said hollow waveguide is a hollow rectangular ridged waveguide section, and said dielectric plug member has a shape corresponding in cross-section to the internal cross-section of said hollow waveguide section.

References Cited in the file of this patent

UNITED STATES PATENTS

| | | |
|---|---|---|
| 2,398,606 | Wang | Apr. 16, 1946 |
| 2,648,047 | Hollingsworth | Aug. 4, 1953 |
| 2,752,572 | Bird | June 26, 1956 |
| 2,846,647 | Macpherson | Aug. 5, 1958 |
| 3,040,252 | Novak | June 19, 1962 |

UNITED STATES PATENT OFFICE
CERTIFICATE OF CORRECTION

Patent No. 3,143,703                                           August 4, 1964

Lincoln D. Kraeuter

It is hereby certified that error appears in the above numbered patent requiring correction and that the said Letters Patent should read as corrected below.

Column 1, line 66, after "heat" insert -- energy --; column 2, line 66, for "Lower" read -- Low --; line 72, before "the" insert -- in --; column 3, line 26, for "reffections" read -- reflections --; column 4, line 20, for "protroducing" read -- protruding --.

Signed and sealed this 9th day of March 1965.

(SEAL)
Attest:

ERNEST W. SWIDER
Attesting Officer

EDWARD J. BRENNER
Commissioner of Patents